United States Patent [19]

Schall et al.

[11] 4,268,975
[45] May 26, 1981

[54] APPARATUS FOR PRE-HEATING THERMOPLASTIC PARISONS

[75] Inventors: Wayne E. Schall; John E. Miller, both of Toledo; John F. Gabriel, Sylvania, all of Ohio

[73] Assignee: Owens-Illinois, Inc., Toledo, Ohio

[21] Appl. No.: 116,327

[22] Filed: Jan. 28, 1980

[51] Int. Cl.³ .............................................. F26B 13/12
[52] U.S. Cl. ........................................ 34/105; 34/169; 34/182; 264/535; 425/445
[58] Field of Search ................ 425/445, 526; 264/535; 432/9; 198/533, 524; 34/169, 181, 182, 225, 164, 104, 105

[56] References Cited

U.S. PATENT DOCUMENTS

| | | | |
|---|---|---|---|
| 2,163,556 | 6/1939 | Glaze | 34/164 |
| 2,876,557 | 3/1959 | Ducatteau | 34/164 |
| 4,117,050 | 9/1978 | Appel et al. | 425/526 |

Primary Examiner—Larry I. Schwartz
Attorney, Agent, or Firm—Steve M. McLary; M. E. Click; D. H. Wilson

[57] ABSTRACT

This invention relates to an apparatus for effecting the uniform pre-heating of thermoplastic parisons of the type that are introduced into a blow molding machine for fabrication into a blow molded article. The invention provides a hopper which is intermittently supplied with batches of parisons and through which the parisons move by gravity. A convection heating zone is provided in the hopper to uniformly heat each parison passing therethrough, and a temperature equalization zone is provided adjacent to the heating zone. The parisons are removed from the temperature equalization zone by a continuously moving parison conveyor which forms part of the temperature equalization zone.

7 Claims, 4 Drawing Figures

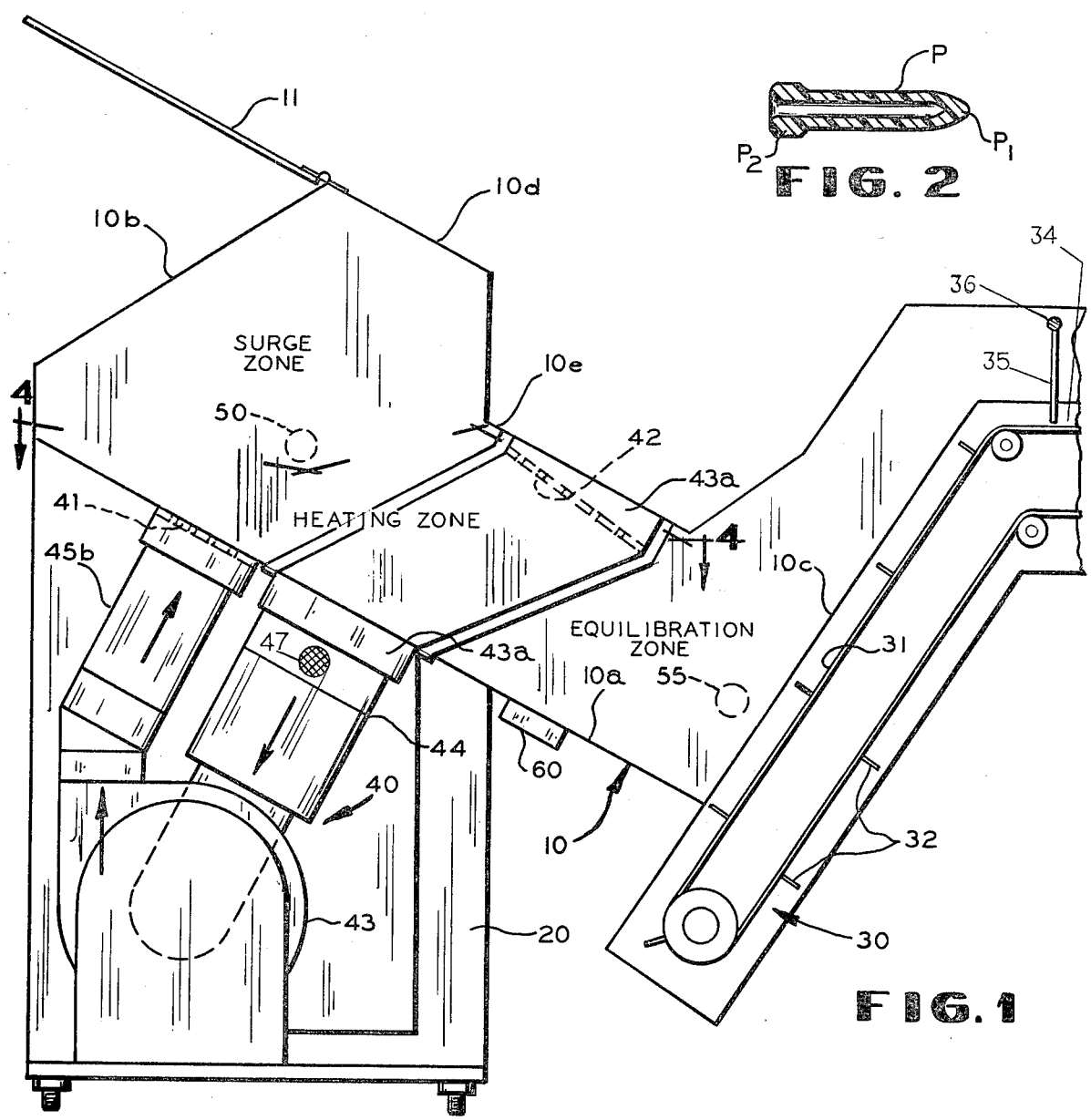
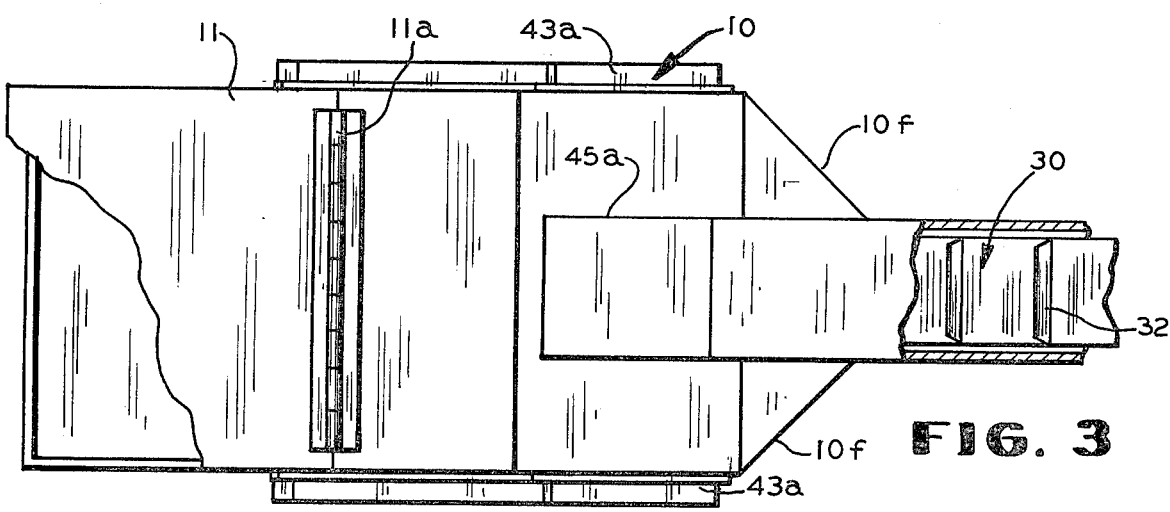

APPARATUS FOR PRE-HEATING THERMOPLASTIC PARISONS

BACKGROUND OF THE INVENTION

In the art of forming hollow plastic articles, such as bottles, there has long been utilized a machine which takes a pre-formed tubular parison, effects the heating of such parison to a blowable temperature, encloses the heated parison in a blow mold and effects the blowing of the parison to the configuration of the desired article.

When such machines are efficiently operated, they are operated continuously, and the amount of heat applied to each parison is a function of the time during which the parison moves through a heating zone. It therefore follows that if the initial temperatures of the parisons, as supplied to the heating zone, vary substantially due to either ambient or storage conditions, such parisons will not achieve the same uniform blowing temperature that is required to insure both efficient operation of the machine and the production of quality blown containers.

Any form of in-line pre-heating apparatus, wherein the parisons are successively heated prior to being transferred to the heating area of the blow molding machine would be subject to the same defects. Moreover, whenever it is required to shut down the operation of the blow molding machine, the operator is faced with two choices, either of which is undesirable. He can either permit the in line pre-heating device to continue to operate and discard the pre-heated parisons, or he can interrupt the operation of the in line pre-heater and thereby run the risk of over-heating the parisons that are exposed to the source of heat within the pre-heating device.

There is, therefore, distinct need for a parison pre-heater which, while functioning on a batch basis, requiring only an intermittent supply of cold parisons thereto, will nevertheless deliver uniformly heated parisons to the bottle blowing machine, regardless of the speed of operation of such machine or even after the machine has been shut down momentarily for temporary repairs. The prior art has not provided a parison heating arrangement having these capabilities.

SUMMARY OF THE INVENTION

The parison pre-heating apparatus in accordance with this invention comprises a totally enclosed hopper, having a pivoted lid to permit cold parisons to be intermittently supplied thereto, and a vertically sloped floor assuring that the parisons will gradually move by gravity from the entry point, which is at the high end of the floor, to the discharge point which is at the low end of the floor. In a medial portion of the flow path of the parisons through the hopper, a generally horizontally extending convection heating zone is defined by the passage of a continuous stream of air heated to a constant temperature. Between the convection heating zone and the discharge end of the hopper, there is provided a temperature equalization chamber of sufficient size to insure that every parison entering the chamber will have time for its temperature to equalize before it is discharged from the chamber of the hopper. The discharge of the parisons from the hopper is accomplished by a moving belt-type conveyor, a major portion of which is disposed within the side walls of the hopper and hence forms part of the equalization chamber. The conveyor carries flight bars so that successive parisons may be engaged by the flight bars and carried upwardly by the conveyor, then through an air dam to a discharge point where they enter the parison heating stage of a blow molding machine.

To insure that the heating zone of the hopper is always filled with parisons, a photoelectric beam detector is provided which scans the interior of the hopper in advance of the heating zone and energizes a signal anytime that the beam is not interrupted by an accumulation of parison at such location.

In accordance with a modification of this invention, in the infrequent event that a jamming of parisons occurs in the heating zone of the hopper, a second photoelectric beam detecting mechanism is provided which traverses the interior of the hopper at a position adjacent to the discharge opening of the hopper and the absence of parisons in this area activates a photo-electric beam detector and causes a vibrator, attached to the sloped bottom surface of the hopper, to be temporarily activated to cause any jam of the parisons in the hopper to be immediately released and the gravity flow of parisons through the hopper resumed.

The temperature achieved by the parisons is independent of the continuity of withdrawal of parisons from the hopper by the elevator. Thus, the operation of the blow molding machine may be intermittently interrupted without effect on the uniformity of pre-heat of the parisons.

Other objects and advantages of the invention will be readily apparent to those skilled in the art from the following detailed description, taken in conjunction with the annexed sheets of drawings on which is shown a preferred embodiment of the invention.

BRIEF DESCRIPTION OF THE DRAWINGS

FIG. 1 is a schematic side elevational view, with portions broken away, of a pre-heating apparatus embodying this invention;

FIG. 2 is a sectional view of a plastic bottle parison which is to be preheated;

FIG. 3 is a top plan view of FIG. 1 with portions broken away for clarity.

DESCRIPTION OF PREFERRED EMBODIMENT

Figure 4:
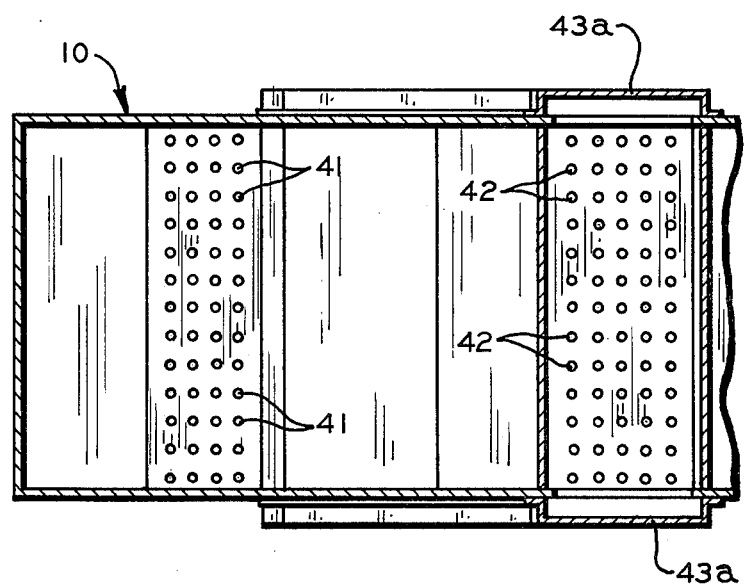
FIG. 4 is a sectional view taken on the plane 4—4 of FIG. 1.

Referring to the drawings, a totally enclosed hopper 10 is provided which is supported with its bottom wall 10a in a vertically inclined position by an articulated welded frame structure 20. The top end wall 10b of the hopper is open and is normally closed by lid 11 pivoted thereto by hinge 11a. The lower end wall 10c of the hopper 10 is likewise open and overlies the upwardly moving flight 31 of an enclosed conveyor 30. The top wall 10d of hopper 10 generally follows the inclined configuration of bottom wall 10a but has its medial portion depressed as indicated at 10e to mount the perforated discharge outlet 42 of a circulating air or convection heating system 40. The hopper inlet opening of the air heating system 40 is defined by a perforated plate 41 located in the inclined bottom wall of the hopper 10a. Thus the path of heating air through the hopper 10 is from the inclined bottom wall 10a to the opposed top wall portion 10e, but following a generally horizontally, upwardly inclined path defining a heating zone through which all parisons P inserted in the hopper 10 will pass.

Parisons P (FIG. 2) are dumped in the hopper in random fashion. Normally, such thermoplastic parisons are of generally cylindrical configuration having a closed end P1 and an open end P2 having a generally thickened rim portion from which the neck finish of the blown article, in the case of a bottle, is formed. When such parisons P are loaded into the hopper 10 in random fashion, they will be respectively disposed in the hopper in three distinct zones, namely, a surge zone at the top end of the hopper which permits the hopper to be intermittently supplied with parisons by an attendant; below the surge zone is the heating zone in which the parisons are subject to the action of heated air from the convection heating system 40. Below the heating zone is the so-called equilibration zone wherein the pre-heated parisons P are permitted to obtain a uniform temperature throughout the parison body, since it is obviously impossible that all portions of each parison would be subjected to the same amount of heating by the flow of the heated air around the parison during its passage through the heating zone.

The fact that the conveyor 30 is totally enclosed in effect makes the upward moving flight 31 of the conveyor 30 an extension of the equilibration zone. To prevent excessive loss of heated air through the horizontal outlet end 34 of the conveyor 30, a suitable flapper valve 35 is provided which is pivotally mounted on a transverse pin 36 between the side walls of the housing portion surrounding the outlet end of the conveyor 30. Thus only a minimal amount of the warm air will be lost through the outlet end of the conveyor and the parisons on the conveyor are provided with additional time to achieve temperature equalization.

The convection heating apparatus 40 comprises a conventional blower 43 having its inlet connected by a suitable ducting to a heating chamber 44, which is connected by ducting 43a to the discharge opening 42 in the top wall portion 10e. Conventional thermostatically controlled heating elements (not shown) are provided in chamber 44 to maintain the discharged heated air at a uniform temperature. The pressurized outlet of the blower 43 is connected by ducting 45b to the perforated panel 41 provided as part of the hopper bottom surface 10a. The heated air then flows around the randomly distributed parisons P, effecting the heating of the same, and into the perforated discharge panel 42. To make up for the modest quantity of warm air lost through the discharge end of the conveyor 30, a fresh air inlet 47 may be provided at any convenient point in the inlet ducting for the blower 43. Preferably, such inlet includes a conventional filter.

To supply pre-heated parisons P to a blow molding machine, the conveyor 30 is provided with upstanding flight bars 32 which engage adjacent parisons and effect the successive removal of the parisons P from the hopper 10 at a point adjacent the upper end of the hopper. It will be noted that the side walls 10f (FIG. 3) of the hopper 10 which are immediately adjacent to the conveyor 30, are sloped inwardly to assist the directing the pre-heated parisons P into engagement with the upwardly moving flight 31 of conveyor 30. More importantly, the conveyor 30 is enclosed by walls 33 and flapper valve 35 and hence, constitutes an extension of the equalization chamber.

It is, of course, necessary that the number of parisons disposed in the hopper 10 be sufficient to maintain the level above the heating zone. To insure this condition, a photoelectric detecting mechanism 50 is provided which directs a beam of light across the surge zone of hopper 10 at a point above the heating zone and, so long as such beam of light is interrupted by an accumulation of parisons in the surge zone, nothing happens. If there are not sufficient parisons in the surge zone, the light beam traverses the interior of the surge zone and impinges upon a suitable detector (not shown) which energizes a warning light or an audible signal to inform the operator that additional parisons must be loaded into the hopper 10.

It occasionally happens due to the random distribution of the parisons P within the hopper 10, that a jamming of such parisons can occur. This will be indicated by a failure of supply of parisons to the flight 31 of conveyor 30. To detect this condition, a photo-electric unit 55 is provided which directs a beam of light across the equilibration zone immediately adjacent the conveyor 30 and, when this beam is not interrupted by any parison, the photo-electric beam receiver (not shown) energizes a vibrator 60 which is secured to the underside of the inclined bottom floor 10a of hopper 10 and imparts a vibration to the hopper 10 sufficient to dislodge the parison jam and reestablish the flow of parisons onto the upwardly moving conveyor flight 31 of conveyor 30. As soon as this occurs, the photoelectric receiving unit is de-energized and the vibrator 60 is similarly de-energized until the next jam occurs.

Since the parisons P are normally formed of a thermoplastic material, they are susceptible to scratching, hence it is desirable that all interior surfaces of the hopper 10 which would contact the parisons P, as well as the flight surfaces of the conveyor 30 be coated with a suitable plastic, such as Teflon, which will not effect the scratching of the parisons P coming in contact therewith.

Those skilled in the art will recognize that once the hopper 10 has been filled with parisons and sufficient parisons withdrawn therefrom to insure that all parisons contained within the equilibration chamber have slowly passed through the heating zone the temperature of the pre-heated parisons, as discharged by the conveyor 30, will be maintained at the same level regardless of whether the conveyor 30 is operated continuously or intermittently. Since the heating air is thermostatically controlled, the parisons contained in the hopper 10 never have the opportunity to be over-heated by such air and never achieve a temperature in excess of the temperature of the heated air. So long as this temperature is maintained at a modest level on the order of 120 degrees F., absolutely no thermal damage can occur to the parisons during their residence in the preheating hopper 10.

Those skilled in the art will recognize that the specific location of the blower 43 is merely a matter of choice. Such blower could conveniently be located on the top of hopper 10 if desired. The main requirement is that a heating zone of uniform temperature moving air be passed coninuously through the bulk of the parisons contained within the hopper 10 along a prescribed path which insures that every parison passing through the hopper 10 will be subjected to exposure to such heating air for approximately the same minimal length of time.

Modifications of this invention will be readily apparent to those skilled in the art and it is intended that the scope of the invention be determined solely by the appended claims.

We claim:

1. Apparatus for thermally pre-conditioning generally cylindrical thermoplastic parisons for introduction into a blow molding machine, comprising, in combination:
   (1) an enclosed hopper having an inclined bottom floor, generally vertical side walls and a top wall, said floor having sufficient inclination to produce bodily displacement of randomly positioned parisons by gravity from the upper end to the lower end thereof,
   (2) said hopper having a parison receiving opening adjacent the upper end of the inclined floor,
   (3) a parison conveyor movable upwardly past the lower most end of said floor to convey parisons upwardly out of said hopper,
   (4) means for producing a stream of heated air,
   (5) means for directing said heated air around said parison from the inclined floor to the top wall of the hopper thereby defining a heating zone,
   (6) means for controlling the temperature of said heated air entering the hopper to maintain same uniform, and
   (7) said hopper defining a space intermediate said heating zone and said parison conveyor constituting a temperature equalization zone, whereby all parisons removed by the conveyor have all portions thereof preheated to substantially equal temperatures.

2. The apparatus of claim 1 wherein said heating zone is defined by heated air flow through a first perforated plate in the inclined hopper bottom into the hopper and out of a second perforated plate in the top wall of the hopper.

3. The apparatus of claim 2 wherein the heated air is continually recirculated by a blower having its discharge connected to said first perforated plate and its inlet connected to said second perforated plate.

4. The apparatus of claim 3 wherein said heating zone extends along the hopper at an angle slightly above the horizontal to encompass a maximum number of parisons.

5. The apparatus of claim 1, 2, 3, or 4 wherein said parison conveyor is totally enclosed except at the discharge end thereof to effectively extend the temperature equalization zone to said discharge end, and a pivoted flapper valve substantially closing said discharge end but movable to permit heated parisons to pass therethrough.

6. The apparatus of claim 1 plus photo-electric means for indicating when the level of parisons in said hopper decreases to the level of the top of said heating zone.

7. The apparatus of claim 1 or 6 plus a vibrator attached to the hopper floor, and photo-electric means for temporarily energizing said vibrator when no parisons are positioned adjacent said conveyor.

* * * * *